US008955055B1

(12) United States Patent
Bogdanovic et al.

(10) Patent No.: US 8,955,055 B1
(45) Date of Patent: Feb. 10, 2015

(54) CUSTOMER EXTENDABLE AAA FRAMEWORK FOR NETWORK ELEMENTS

(71) Applicant: Juniper Networks, Inc., Sunnyvale, CA (US)

(72) Inventors: Ivan Dean Bogdanovic, Brookline, MA (US); Mathias Kokot, West Medford, MA (US); Sudhir Krishnan, Acton, MA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 13/630,856

(22) Filed: Sep. 28, 2012

(51) Int. Cl.
*G06F 21/20* (2006.01)

(52) U.S. Cl.
USPC .............................................. 726/4

(58) Field of Classification Search
None
See application file for complete search history.

(56) References Cited

U.S. PATENT DOCUMENTS

| | | | | |
|---|---|---|---|---|
| 8,180,885 B2 * | 5/2012 | Bodin et al. | ................... | 709/224 |
| 2003/0191823 A1 * | 10/2003 | Bansal et al. | ................. | 709/220 |
| 2009/0049048 A1 * | 2/2009 | Justen et al. | ....................... | 707/9 |
| 2009/0304009 A1 * | 12/2009 | Kolhi et al. | .................... | 370/400 |
| 2012/0254969 A1 * | 10/2012 | Khosrova et al. | ................. | 726/8 |

OTHER PUBLICATIONS

OSGi Service Platform Core Specification, The OSGi Alliance, Release 4, Version 4.1, Apr. 2007.*
A mobile service middleware supported 4G adaptive multimedia applications, Boade Fanet al, 2006, IEEE.*
OSGi Service Platform Core specification, Release 4, Verison 4.1 Apr. 2007, by the OSGi Alliance.*
OSGi Service Platform Core Specification release 4, version 4.1 published Apr. 2007 by the OSGi alliance.*
"A mobile service middleware supported 4G adaptive multimedia applications" published in 2006 by IEEE authored by Baode Fan et al.*
OSGi Service Platform Release 2 javadoc as published Nov. 17, 2008 by the internet archive waybackmachine at the following URL: http://web.archive.org/web/20070429145013/http://www.osgi.org/javadoc/r2/ (hereinafter referred as "javadoc").*
Calhoun et al. "Diameter Base Protocol" RFC 3588, Network Working Group, The Internet Society, Sep. 2003, 148 pgs.
Rigney et al. "Remote Authentication Dial in User Service (RADIUS)", RFC 2865, Network Working Group, The Internet Society, Jun. 2000, 77 pgs.

(Continued)

*Primary Examiner* — Dede Zecher
*Assistant Examiner* — Richard McCoy
(74) *Attorney, Agent, or Firm* — Shumaker & Sieffert, P.A.

(57) ABSTRACT

In one example, a network device includes computer-readable storage media configured to store information defining a default dictionary associated with one or more default services provided by the network service, one or more interfaces configured to receive configuration data defining a customer dictionary associated with one or more additional services beyond the one or more default services and a to receive a request to access one of the additional services from a subscriber device, and a control unit configured to determine whether an authentication, authorization, and accounting (AAA) server grants access to the requested one of the additional services to the subscriber device, and to configure forwarding information of the network device to cause network traffic associated with the subscriber device to be forwarded to a service unit to perform the one of the additional services when the AAA server grants access to the subscriber device based on the determination.

26 Claims, 4 Drawing Sheets

(56) References Cited

OTHER PUBLICATIONS

Comerica et al. U.S. Appl. No. 13/353,028, filed Jan. 18, 2012 entitled Clustered AAA Redundancy Support Within a Radius Server.

Sahai et al. U.S. Appl. No. 12/947,463, filed Nov. 16, 2010 entitled Policy and Charging Control Rule Precedence Mapping in Wireless Content Access Networks.

Rijsman et al. U.S. Appl. No. 13/547,978, filed Jul. 12, 2012 entitled Routing Protocol Interface for Generalized Data Distribution.

* cited by examiner

CUSTOMER EXTENDABLE AAA FRAMEWORK FOR NETWORK ELEMENTS

TECHNICAL FIELD

This disclosure relates to computer network devices, and more particularly, to management of computer network devices.

BACKGROUND

Network service providers typically deploy one or more server devices to manage authentication, authorization, and accounting (AAA) functionality for networks that offer services to subscribers using client devices. Remote Authentication Dial In User Service (RADIUS) protocol is commonly used by the server devices to communicate with client devices. The RADIUS protocol is described in Carl Rigney et al., "Remote Authentication Dial In User Server (RADIUS)," Network Working Group of the Internet Engineering Task Force (IETF), RFC 2865, June 2000, which is incorporated herein by reference in its entirety (referred to hereinafter as "RFC 2865"). The Diameter protocol is another protocol that server devices use to communicate with client devices. The Diameter protocol is described in P. Calhoun et al., "Diameter Base Protocol," Network Working Group of the Internet Engineering Task Force (IETF), RFC 3588, September, 2003, which is incorporated herein by reference in its entirety (referred to hereinafter as "RFC 3588"). In general, this disclosure refers to "AAA protocols," which may include RADIUS and Diameter. Moreover, it should be understood that Diameter may be used in place of RADIUS, and vice versa, unless otherwise noted.

To request access to a service, a subscriber connects to a network access server (NAS) that acts as a gateway to the service as provided by a service provider network (or the Internet). If the NAS is a RADIUS client configured to communicate with a RADIUS server for the service provider network using the RADIUS protocol, the NAS confirms that the subscriber is authentic and is authorized to access the service by requesting the RADIUS server to validate the access request from the subscriber. After validating an access request, the RADIUS server responds to the NAS with a RADIUS protocol message directing the NAS to accept the access request and establish a session enabling connectivity between the subscriber and the service provider network for the requested service.

Typically, services available for such requests from client devices are pre-programmed in server devices. If an administrator of an organization, such as a service provider or enterprise, wants to enable a new action on a network element via an AAA protocol, the administrator typically has to deploy a RADIUS proxy at a central location and develop an application that will execute the action on the network element. The RADIUS proxy operates as a full proxy server that is positioned between a RADIUS client and a AAA server. The AAA server and RADIUS client are generally unaware of the presence of the RADIUS proxy. The RADIUS proxy operates on messages communicated between the RADIUS client and the AAA server. Alternatively, the administrator may contact a vendor for the network element to implement the desired functionality, and the vendor may in turn create a Vendor Specific Attribute.

SUMMARY

In general, this disclosure describes techniques for providing a customer-extensible authentication, authorization, and accounting (AAA) framework for network elements. This disclosure recognizes certain problems that may be associated with conventional methods for enabling new functionality on a network element using AAA. For example, using a centrally-deployed RADIUS proxy may not bring desired scalability and performance. Likewise, requesting development of a Vendor Specific Attribute by a vendor may take a significant amount of time, which may not fit into the schedule of desired plans of an administrator of an organization, such as a service provider or enterprise. To attempt to overcome these and other problems, this disclosure describes a customer-extensible AAA framework in which customers themselves (e.g., administrators of organizations) extend the functionality of network elements using AAA protocols, such as RADIUS and Diameter.

In one example, a method includes receiving, by a network device comprising a default dictionary associated with one or more default services provided by the network device, configuration data defining a customer dictionary associated with one or more additional services beyond the one or more default services, receiving a request to access one of the additional services from a subscriber device, determining whether an authentication, authorization, and accounting (AAA) server grants access to the requested one of the additional services to the subscriber device as indicated by data of a AAA response message, and configuring, using an action determined using the customer dictionary, forwarding information of the network device to cause network traffic associated with the subscriber device to be forwarded to a service unit to perform the one of the additional services when the AAA server grants access to the subscriber device based on the data of the AAA response message and the determination.

In another example, a network device includes one or more computer-readable storage media configured to store information defining a default dictionary associated with one or more default services provided by the network service, one or more interfaces configured to receive configuration data defining a customer dictionary associated with one or more additional services beyond the one or more default services and a to receive a request to access one of the additional services from a subscriber device, and a control unit configured to determine whether an authentication, authorization, and accounting (AAA) server grants access to the requested one of the additional services to the subscriber device as indicated by data of a AAA response message, and to configure, using an action determined using the customer dictionary, forwarding information of the network device to cause network traffic associated with the subscriber device to be forwarded to a service unit to perform the one of the additional services when the AAA server grants access to the subscriber device based on the data of the AAA response message and the determination.

In another example, a system includes an authentication, authorization, and accounting (AAA) server, and a network device configured to store information defining a default dictionary associated with one or more default services provided by the network service, receive configuration data defining a customer dictionary associated with one or more additional services beyond the one or more default services, to receive a request to access one of the additional services from a subscriber device, determine whether the AAA server grants access to the requested one of the additional services to the subscriber device as indicated by data of a AAA response message, and configure, using an action determined using the customer dictionary, forwarding information of the network device to cause network traffic associated with the subscriber device to be forwarded to a service unit to perform the one of the additional services when the AAA server grants access to the subscriber device based on the data of the AAA response message and the determination.

In another example, a computer-readable medium, such as a computer-readable storage medium, contains, e.g., is encoded with, instructions that cause a programmable processor to receive, by a network device comprising a default dictionary associated with one or more default services provided by the network device, configuration data defining a customer dictionary associated with one or more additional services beyond the one or more default services, receive a request to access one of the additional services from a subscriber device, determine whether an authentication, authorization, and accounting (AAA) server grants access to the requested one of the additional services to the subscriber device as indicated by data of a AAA response message, and configure, using an action determined using the customer dictionary, forwarding information of the network device to cause network traffic associated with the subscriber device to be forwarded to a service unit to perform the one of the additional services when the AAA server grants access to the subscriber device based on the data of the AAA response message and the determination.

The details of one or more examples are set forth in the accompanying drawings and the description below. Other features, objects, and advantages will be apparent from the description and drawings, and from the claims.

DETAILED DESCRIPTION

Figure 1:
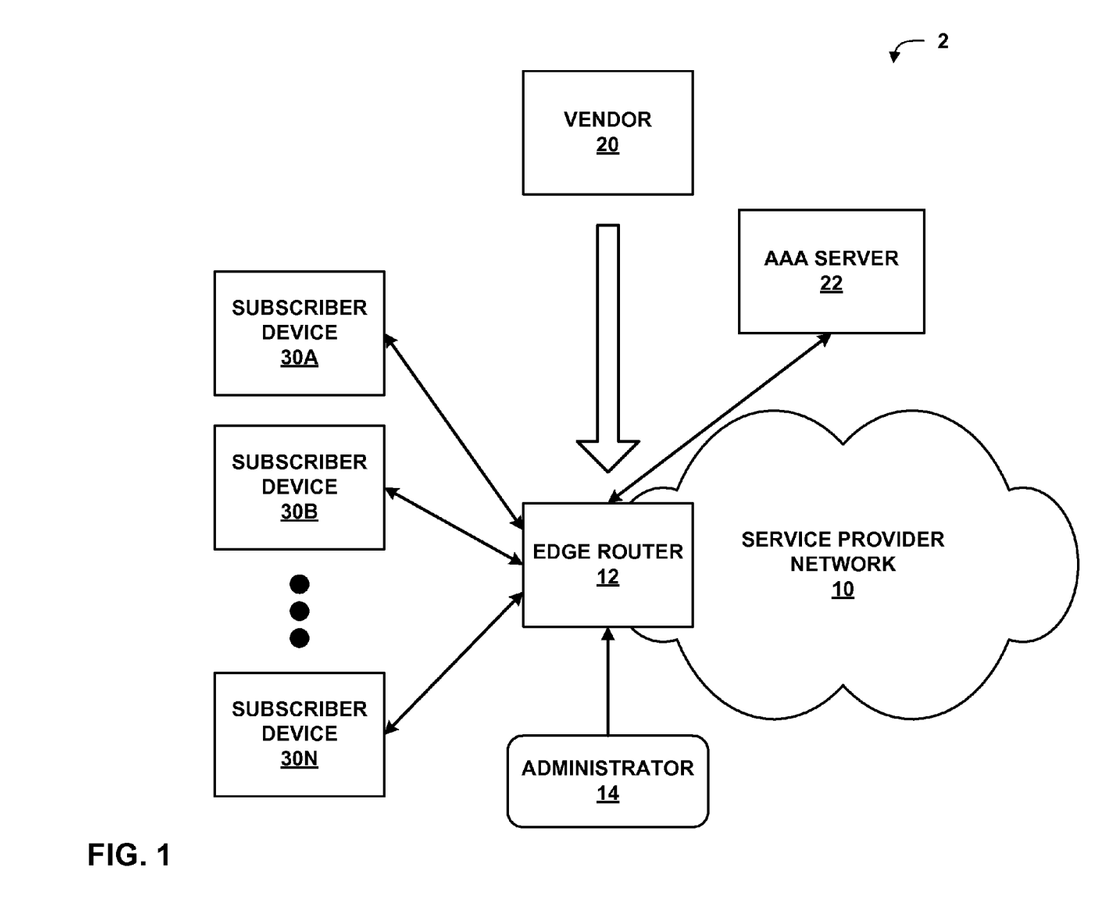
FIG. 1 is a block diagram illustrating an example system including an edge router that can be configured to provide additional services beyond those originally provided by a vendor.

FIG. 1 is a block diagram illustrating an example system 2 including edge router 12 that can be configured to provide additional services beyond those originally provided by vendor 20. The example of FIG. 1 illustrates vendor 20, authentication, authorization, and accounting (AAA) server 22, subscriber devices 30A-30N (subscriber devices 30), and service provider network 10, which includes edge router 12, and administrator 14. In this example, vendor 20 represents a vendor of network elements, such as edge router 12. Vendor 20 may provide other network elements as well, such as switches, hubs, gateways, security devices such as firewalls and intrusion detection and prevention (IDP) devices, and the like.

In general, service provider network 10 supports one or more packet-based services that are available for request and use by subscriber devices 30. As examples, service provider network 12 may provide Internet access, bulk data delivery, voice over Internet protocol (VoIP), Internet Protocol television (IPTV), Short Messaging Service (SMS), Wireless Application Protocol (WAP) service, Telnet, or customer-specific application services. Service provider network 12 may include, for instance, a local area network (LAN), a wide area network (WAN), the Internet, a virtual LAN (VLAN), an enterprise LAN, a layer 3 virtual private network (VPN), an Internet Protocol (IP) intranet operated by a network service provider that also operates an access network, an enterprise IP network, a content delivery network (CDN), or any combination thereof. In various examples, service provider network 10 may be connected to a public WAN, the Internet, or to other networks. Service provider network 10 executes one or more packet data protocols (PDPs), such as IP (IPv4 and/or IPv6), X.25 or Point-to-Point Protocol (PPP), to enable packet-based transport of Service provider network 10 services.

Edge router 12 is communicatively coupled to subscriber devices 30 and provides access to service provider network 10 to subscriber devices 30. In particular, as discussed in greater detail below, edge router 12 communicates with AAA server 22 using a AAA protocol to determine whether subscriber devices 30 are permitted to access services provided by service provider network 10. The use by a network device, such as edge router 12, of a AAA protocol when determining whether to grant access to services is described in greater detail in Comerica et al., "CLUSTERED AAA REDUNDANCY SUPPORT WITHIN A RADIUS SERVER," U.S. patent application Ser. No. 13/353,028, filed Jan. 18, 2012, which is hereby incorporated by reference in its entirety. Other aspects of AAA protocols are also described in Sahai et al., "POLICY AND CHARGING CONTROL RULE PRECEDENCE MAPPING IN WIRELESS CONTENT ACCESS NETWORKS," U.S. patent application Ser. No. 12/947,463, filed Nov. 16, 2010, which is hereby incorporated by reference in its entirety.

In this manner, edge router 12 acts as a network access server (NAS) in the example of FIG. 1. Edge router 12 and/or other devices within service provider network 10 (not shown in FIG. 1) may be configured to perform the various services for subscriber devices 30 discussed above. It should be understood that subscriber devices 30 are not necessarily directly coupled to edge router 12, but may instead be coupled via one or more other devices (not shown), such as devices forming an access network.

In general, AAA protocols, such as RADIUS and Diameter, are used as a means of controlling and monitoring network access. As discussed below, edge router 12 is configured, in the example of FIG. 1, to execute a AAA client, such as a RADIUS client, so that correct attributes can be sent to AAA server 22 during authentication of incoming sessions from subscriber devices 30. AAA server 22 may reside at a service complex or data center. As shown in the example of FIG. 1, the sessions authenticated using AAA server 22 may be sessions for a broadband edge router, e.g., edge router 12, or in other examples, a session may be identified by the allocation of certain network resources on demand.

In this example, an AAA client is embedded within edge router 12, e.g., as software executed by edge router 12. AAA clients generally include a well-defined set of features that can be configured using a command line interface (CLI) or by means of a management tool, such as a network management server (NMS) (not shown). Rules are typically used to determine what information is placed to which attribute. There are various RFCs that stipulate examples of such rules.

AAA proxies (not shown) may be used to control messages that flow between AAA clients and AAA servers, such as edge router 12 and AAA server 22. To a AAA client, a AAA proxy acts as a AAA server, whereas to AAA servers, the AAA proxy acts as a AAA client. Proxies may be used to perform operations on messages that neither the client nor the server can perform. They can also perform other tasks, such as load balancing across servers and handling server failure, e.g., failover to another server that is still active. Network service providers use proxies to add flexibility into the AAA infrastructure.

When AAA proxies are used, they are typically deployed in a central location, such as a service complex or data center, to support the large number of edge routers that could potentially be in a network. In accordance with the techniques of this disclosure, however, a AAA client (e.g., executed by edge router 12) may include the same flexibility as a standalone proxy by integrating proxy client functionality within the AAA client of edge router 12. Thus, unlike a AAA proxy, which as both the proxy server and proxy client functions, the AAA client executed by edge router 12 may include a combination of a AAA client and proxy client functionality. The AAA client may perform the RFC standard rules-based conversion of session data into attributes. The AAA client may also implement special rules as needed by a service provider corresponding to service provider network 10. The proxy client may be used to provide a flexible mechanism to map a session from the AAA client into different attributes, as needed by the service provider.

These techniques may simplify presentation of information in attributes supported by the AAA client executed by edge router 12. The embedded proxy client, also executed by edge router 12, can then be programmed by administrator 14 (acting as an operator for the service provider) to package that information into attributes, as desired.

These client-proxy client techniques may achieve a flexibility of having a network-wide proxy without having to deploy a physical AAA proxy at a central location. Each edge router, such as edge router 12, can perform the flexible mapping of session information to attributes for sessions that are terminated within itself. This may provide a scalable solution across the network while avoiding a single point of failure for the AAA infrastructure. Another potential advantage of the proxy client being closely embedded with the client is that it could combine information from more than one session. For example, the proxy client may combine a subscriber session and a network address translation (NAT) session. This may alleviate the burden towards AAA server 22, while providing a single client interface for each of the aggregated sessions.

Although these techniques may add to the processing load of a central processing unit (CPU) of edge router 12, the benefits of flexibility may outweigh the costs of such additional load. Moreover, this added load may be alleviated in the way the proxy client is architected. For example, one core within the CPU of edge router 12 may be dedicated to AAA proxy client instances, while another core may be dedicated to AAA client instances.

Accordingly, subscriber devices 30 communicate with edge router 12 to receive services available via service provider network 10. Each of subscriber devices 30 may represent, for example, a workstation, desktop computer, laptop computer, cellular or other mobile device, Personal Digital Assistant (PDA), gaming console, television set-top box, smart phone, tablet computer, or any other device capable of accessing a computer network via a wireless and/or wired connection. Each of subscriber devices 30 may be associated with a user. Applications that access services provided by service provider network 10 may alternatively be referred to as "user agents." In this example, any of subscriber devices 30 may connect to edge router 12 in order to access service provider network 10.

More particularly, to request access to a service provided by service provider network 10, subscriber devices 30 forward authentication credentials (e.g., a login identifier and a password) to edge router 12. Edge router 12 is generally configured to use AAA to determine whether subscriber devices 30 are permitted to access certain services. In the example of FIG. 1, edge router 12 is configured as a AAA client with respect to AAA server 22. For example, in response to receiving the authentication credentials from one of subscriber devices 30, e.g., subscriber device 30A, for a particular service, a AAA client module (not shown in FIG. 1) executed by edge router 12 communicates with AAA server 22 to authenticate and authorize subscriber device 30A. AAA server 22 may also perform accounting with respect to the requested service, e.g., for billing a user of subscriber device 30A. In this manner, edge router 12 can determine whether subscriber device 30A is authenticated, and if so, forward packets in a communication session including subscriber device 30A to devices of service provider network 10 (and, likewise, other packets to subscriber device 30A) to provide the services to which subscriber device 30A is subscribed.

AAA server 22 may represent, for example, a Remote Authentication Dial In User Service (RADIUS) server or a Diameter server. In the example of RADIUS, subscriber device 30A may send credentials, such as a login identifier and password, to edge router 12, along with a request to access a particular service. Edge router 12, in turn, sends a RADIUS Access-Request message to AAA server 22 for subscriber device 30A, indicating that subscriber device 30A is attempting to invoke a particular service. AAA server 22 may then respond with an Access-Accept message to grant subscriber device 30A access to the requested service, an Access-Reject message to deny subscriber device 30A access to the requested service, or an Access-Challenge message to request additional authentication credentials. More particularly, if AAA server 22 includes a configuration record for the subscriber and the authorization credentials are correct, AAA server 22 returns a RADIUS protocol Access-Accept message to edge router 12. On the other hand, if a match is not found or a problem is found with the authentication credentials, AAA server 22 may return an Access-Reject message. Edge router 12 may then forward accounting information to AAA server 22 to document the transaction. AAA server 22 may store or forward this information to support billing for the services provided.

In addition to the credentials discussed above, edge router 12 constructs the RADIUS Access-Request message to include one or more attributes. For example, the Access-Request message may include one or more vendor-specific attributes (VSAs). RFC 2865, which describes the RADIUS protocol, indicates that a type value of "26" represents a VSA. As noted above, vendor 20 represents a vendor of edge router 12. In general, vendor 20 creates one or more VSAs associated with pre-configured services for edge router 12. That is, vendor 20 provides respective VSAs for one or more services in which vendor 20 configures edge router 12 to participate.

In accordance with the techniques of this disclosure, administrator 14 also has the ability to create new VSAs, without further input by vendor 20. That is, rather than requesting that vendor 20 create new VSAs for new services, administrator 14 can use the techniques of this disclosure to extend the AAA capabilities of, e.g., edge device 12 and AAA server 22. In particular, vendor 20 may allow administrator 14 to have visibility into VSAs of edge router 12 to extend the existing control platform. This may allow dynamic service creation through interaction with AAA server 22.

In one example, AAA server 22 and edge router 12 are configured with a default dictionary, created by vendor 20. The default dictionary generally defines a correspondence between attribute/value pairs and actions to be performed to configure edge router 12. The default dictionary may correspond to an eXtensible Markup Language (XML) file. In general, the attribute/value pairs represent attributes, and values for the attributes, that may be exchanged as VSAs between edge router 12 and AAA server 22. The default dictionary represents services that are pre-configured by vendor 20.

In addition, administrator 14 may create a customer dictionary, e.g., for service provider network 10. That is, the "customer dictionary" corresponds to service provider network 10 acting as a customer of vendor 20. Like the default dictionary, the customer dictionary maps attribute/value pairs to actions. The customer dictionary is also stored by both edge router 12 and AAA server 22.

Unlike the default dictionary, however, the customer dictionary is defined for services other than those that were originally configured for edge router 12. Moreover, the actions may correspond to scripts (e.g., operation scripts (opscripts)) written for edge router 12, applications developed using a software development kit (SDK) for edge router 12, and/or virtual services. Administrator 14, or another administrator or user of edge router 12, may define or program the actions, in addition to defining the customer dictionary. Programming of a network device, such as edge router 12, to configure an action as described herein is described in greater detail in Rijsman, "ROUTING PROTOCOL INTERFACE FOR GENERALIZED DATA DISTRIBUTION," U.S. patent application Ser. No. 13/547,978, filed Jul. 12, 2012, which is hereby incorporated by reference in its entirety.

In this manner, if one of subscriber devices 30 requests access to a particular service, whether a pre-defined service or a service subsequently offered by service provider network 10, edge router 12 submits an appropriate VSA in a AAA request message to AAA server 22. AAA server 22 uses either the default dictionary or the customer dictionary, as appropriate, to interpret the VSA. Additionally or alternatively, AAA server 22 uses the default dictionary or customer dictionary, again as appropriate, to send an AAA response (e.g., an access-accept or access-reject message) including a VSA for configuring edge router 12. For example, the VSA may include an attribute/value pair that the default dictionary, or customer dictionary, associates with a value for execution, e.g., by an opscript, an application developed using an SDK for edge router 12, and/or a virtual service.

In particular, execution using the value configures edge router 12 to direct traffic for a corresponding one of subscriber devices 30 through service provider network 10 and/or to a service plane of edge router 12. In either case, configuring edge router 12 updates forwarding information in the forwarding plane (also referred to as the data plane) of edge router 12. For example, edge router 12 may update a forwarding information base (FIB) based on actions indicated by one of the dictionaries and based on whether one of subscriber devices 30 is authenticated and authorized for a particular service.

As an example, a subsequently added service, that is, a service not originally configured by vendor 20, may include a security service, such as a deep packet inspection service. When a subscriber device, e.g., subscriber device 30A, requests the deep packet inspection service and is authorized and authenticated, edge router 12 may update forwarding information to direct traffic of communication sessions including subscriber device 30A to a deep packet inspection unit. The deep packet inspection unit may comprise a service card in the service plane of edge router 12 or a separate device in service provider network 10. In either case, edge router 12 may update forwarding information such that network traffic associated with subscriber device 30A is forwarded to the deep packet inspection unit.

These techniques may provide various advantages. For example, these techniques may decouple service control innovation. In this manner, administrator 14 can configure edge router 12, as well as other devices of service provider network 10, to support new services without intervention by vendor 20. Furthermore, these techniques may allow enterprises and service providers to create custom solutions for providing services based on development cycles of the respective enterprises and service providers. That is, there need not be synchronization between customer (e.g., enterprises and service providers) development cycles with the development cycles of vendor 20. Moreover, these techniques may allow support of both push and pull control models. That is, the control model may be either subscriber triggered or network triggered.

Although FIG. 1 illustrates edge router 12 as an example of a network device that can utilize the techniques of this disclosure, it should be understood that other devices may also be configured to perform the techniques of this disclosure. In general, any device capable of acting as a AAA client (e.g., a RADIUS client or a Diameter client) may be configured to perform the techniques of this disclosure.

Figure 2:
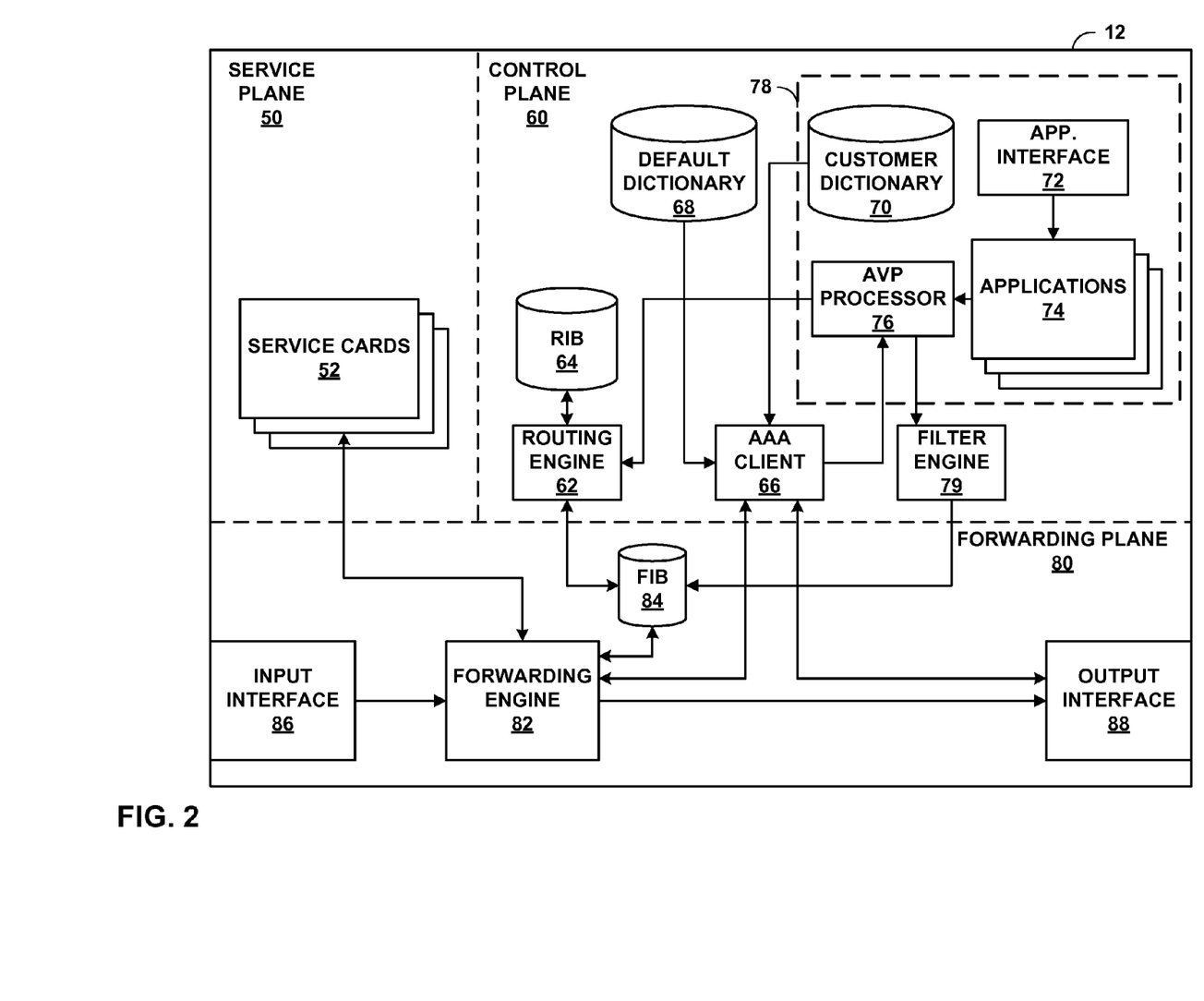
FIG. 2 is a block diagram illustrating an example set of elements of the edge router of FIG. 1.

FIG. 2 is a block diagram illustrating an example set of elements of edge router 12. As described with respect to FIG. 1, edge router 12 is configured to support both pre-configured services and customer-defined services. In this example, edge router 12 is logically partitioned into three planes: service plane 50, control plane 60, and forwarding plane 80 (also sometimes referred to as the data plane). In general, edge router 12 performs or participates in services in service plane 50 using service cards 52. Control plane 60 includes components related to routing and other control elements, such as components related to AAA and programming actions. Forwarding plane 80 includes components related to forwarding network packets.

In this example, forwarding plane 80 includes input interface 86, forwarding engine 82, forwarding information base (FIB) 84, and output interface 88. Input interface 86 and output interface 88 each represent a collection of a plurality of input and/or output interfaces, but are shown separately for purposes of discussion. In some examples, input interface 86 and output interface 88 may correspond to a set of physical network ports, such as Ethernet interfaces. Additionally or alternatively, input and output interfaces may represent other wired or wireless network interfaces. The same interface may, at different times, both act as an input interface and as an output interface.

Forwarding engine 82 refers to data of FIB 84 to determine how to forward received network traffic. For example, in response to receiving a packet via input interface 86, forwarding engine 82 queries FIB 84 to determine how to forward the packet. For example, FIB 84 may indicate that the packet is to be sent directly to output interface 88 for forwarding to a next hop device, to one of service cards 52 to apply one or more services (e.g., deep packet inspection), or to an element of control plane 60, such as routing engine 62 (e.g., when the packet is a route advertisement) or AAA client 66 (e.g., when the packet is a request to access a service).

Service cards 52 provide respective services to received packets. For example, service cards 52 may include any or all of an intrusion detection and prevention (IDP) card, a firewall card, a deep packet inspection card, or other such service oriented cards. In general, when one of service cards 52 receives a packet from forwarding engine 82, the service card performs its respective service on the packet, then forwards the serviced packet back to forwarding engine 82 (assuming that the service has not prevented forwarding the packet). In some examples, when forwarding engine 82 sends packets directly to output interface 88, forwarding engine 82 is said to send packets along the "fast path," whereas when forwarding engine 82 sends packets to service cards 52, forwarding engine 82 is said to send packets along the "slow path."

Control plane 60, in this example, includes routing engine 62, routing information base (RIB) 64, AAA client 66, default dictionary 68, customer dictionary 70, filter engine 79, and application interface 72. Routing engine 62 receives route advertisements from neighboring routers and stores routes to various network destinations (e.g., Internet protocol (IP) addresses), as well as costs associated with the routes, in RIB 64. Routing engine 62 executes various routing protocols to determine routes to various network destinations, and select which of the routes to the destination has a best cost in accordance with the corresponding routing protocol. Routing protocols include interior routing protocols, such as open shortest path first (OSPF), intermediate system to intermediate system (IS-IS), interior gateway routing protocol (IGRP), and enhanced IGRP (EIGRP), and exterior routing protocols, such as border gateway protocol (BGP). After executing a routing protocol and determining an appropriate router, routing engine 62 generates forwarding information that determines a physical output interface that is communicatively coupled to a "next hop" along the route, and updates FIB 84 with the generated forwarding information. Filter engine 79 uses filters to program FIB 84, where the filters are used to determine how to forward traffic. As shown in this example, filter engine 79 receives output from AVP processor 76, corresponding to output generated by executing one of applications 74. Filter engine 79, accordingly, may filter the output generated by executing applications 74 to update FIB 84.

Control plane 60 may be realized by a control unit. In general, a control unit may include stand-alone hardware, a combination of dedicated hardware units, or software and/or firmware in combination with requisite hardware, such as computer-readable media (e.g., memory) and one or more processing units for executing instructions stored in the computer-readable media (e.g., one or more microprocessors).

In accordance with the techniques of this disclosure, control plane 60 provides a AAA framework 78, including a application interface 72, applications 74, customer dictionary 70, and AVP processor 76. In general, AAA framework 78 provides the functionality that might otherwise be realized by a AAA proxy, as discussed with respect to FIG. 1. However, AAA framework 78 is customer extensible, in accordance with the techniques of this disclosure. For example, application interface 72 is configured to receive various applications 74, such as opscripts, software developed using an SDK for edge router 12, or virtual services, that can be executed by edge router 12. Furthermore, a user, such as administrator 14 (FIG. 1) may provide information defining a mapping between a VSA, and a value for the VSA, and one of applications 74. AVP processor 76 may execute customer-provided applications 74 to perform particular actions, e.g., to interact with routing engine 62, which executes routing protocols to generate forwarding information for updating FIB 84 to cause traffic to be directed to a particular one of service cards 52 or a service unit of service provider network 10, in accordance with the application executed by AVP processor 76.

More particularly, default dictionary 68 stores values for VSAs and corresponding actions to be performed upon receipt of one of the values for the VSAs. In general, these actions correspond to vendor-defined services, e.g., from vendor 20 (FIG. 1). Customer dictionary 70 stores values for VSAs and corresponding actions to be performed upon receipt of one of the values for the VSAs. However, the values for VSAs of customer dictionary 70 are mapped to customer-defined services, such as the applications received via application interface 72, e.g., from administrator 14. AAA client 66 may receive AAA messages and provide values for VSAs to AVP processor 76, which may determine an appropriate one of applications 74 to execute based on the VSA and value for the VSA using either default dictionary 68 or customer dictionary 70.

Customer dictionary 70 may be configured as an XML file. For example, customer dictionary 70 may have a format similar to the following:

```
<customer dictionary>
    <version> ## </version>
    <std-attribute-list>
        <std-attribute>
            < attribute-name> </ attribute-name>
            < attribute-type> </ attribute-type >
            < attribute-data-type></ attribute-data-type>
        </std-attribute>
        <std-attribute>
            <attribute-name> </attribute-name>
            <attribute-type> </attribute-type >
            <attribute-data-type></attribute-data-type>
        </std-attribute>
    </std-attribute-list>
    <vsa-list>
        <vsa>
            <vendor-id></vendor-id>
                <attribute-name> </attribute-name>
                <attribute-type> </attribute-type >
                <attribute-data-type></attribute-data-type>
        <action-list>
            <action-set>
            <provision-action>
                <action-type>opscript</action-type>
                <action>
                    <version>1</version>
                <name></name>
                    <param1></param1>
                    <param2></param2>
                </action>
            </provision-action>
```

In the example XML code above, the action is an opscript, although as discussed herein, actions may also comprise applications developed using an SDK for edge router 12 (or an operating system executed by edge router 12) and/or virtual services.

When forwarding engine 82 receives a request from one of subscriber devices 30 (FIG. 1) to establish a communication session to access service provider network 10, forwarding engine 82 forwards the request to AAA client 66 for authentication. In turn, AAA client 66 forms an appropriate AAA request (such as a RADIUS request) and sends the AAA request to AAA server 22 (FIG. 1) via output interface 88. Using one of default dictionary 68 and customer dictionary 70, depending on the service being requested, AAA client 66 may include a value for a VSA in the AAA request corresponding to the requested service. Forwarding engine 82 also forwards AAA responses received via input interface 86 to AAA client 66. AAA client 66 interprets the AAA response to determine whether the requesting device is authorized to access the service or not.

AAA client 66 also provides information to routing engine 62 indicative of whether the subscriber device is authenticated or not. Routing engine 62, in this example, executes the corresponding application for the service to determine how to modify forwarding information of FIB 84, if at all. For example, if the subscriber device is authorized for a security service, routing engine 62 may update FIB 84 such that traffic received from the subscriber device is directed to a security service card of service cards 52. Alternatively, routing engine 62 may update FIB 84 to direct traffic from an authorized subscriber device to a tunnel PIC (packet interface card) of service cards 52, if the service is a tunneling service.

Although AAA framework 78 is shown as being separate from routing engine 62 in this example, it should be understood that in other examples, AAA framework 78 may instead be included within routing engine 62. In addition, any or all of routing engine 62, AAA client 66, AVP processor 76, and forwarding engine 82 may be implemented using any or all of hardware, software, and firmware, alone or in any combination. When implemented in software or firmware, it is presumed that edge router 12 also includes requisite hardware for executing the software or firmware, such as one or more microprocessors. Instructions for software may be stored in one or more computer-readable storage media, such as one or more hard drives (e.g., magnetic or flash drives), CD-ROMs, DVDs, tape media, or the like.

Although only one customer dictionary 70 is shown in FIG. 2, it should be understood that multiple customer dictionaries may be stored for use in AAA. In one example, each attribute-value pair (AVP) corresponds to a customer dictionary. Thus, in one example, there may be one customer dictionary per AVP, and there may be multiple AVPs, such that there are multiple customer dictionaries. Alternatively, a single dictionary may contain multiple AVPs, and a VSA may correspond to a particular AVP. Each AVP may correspond to a service action, either standard or vendor specific, whether implemented by vendor 20, a customer, or a third party.

Accordingly, edge router 12 represents an example of a network device including one or more computer-readable storage media configured to store information defining a default dictionary associated with one or more default services provided by the network service, one or more interfaces configured to receive configuration data defining a customer dictionary associated with one or more additional services beyond the one or more default services and a to receive a request to access one of the additional services from a subscriber device, and a control unit configured to determine whether an authentication, authorization, and accounting (AAA) server grants access to the requested one of the additional services to the subscriber device, and to configure forwarding information of the network device to cause network traffic associated with the subscriber device to be forwarded to a service unit to perform the one of the additional services when the AAA server grants access to the subscriber device based on the determination.

Figure 3:
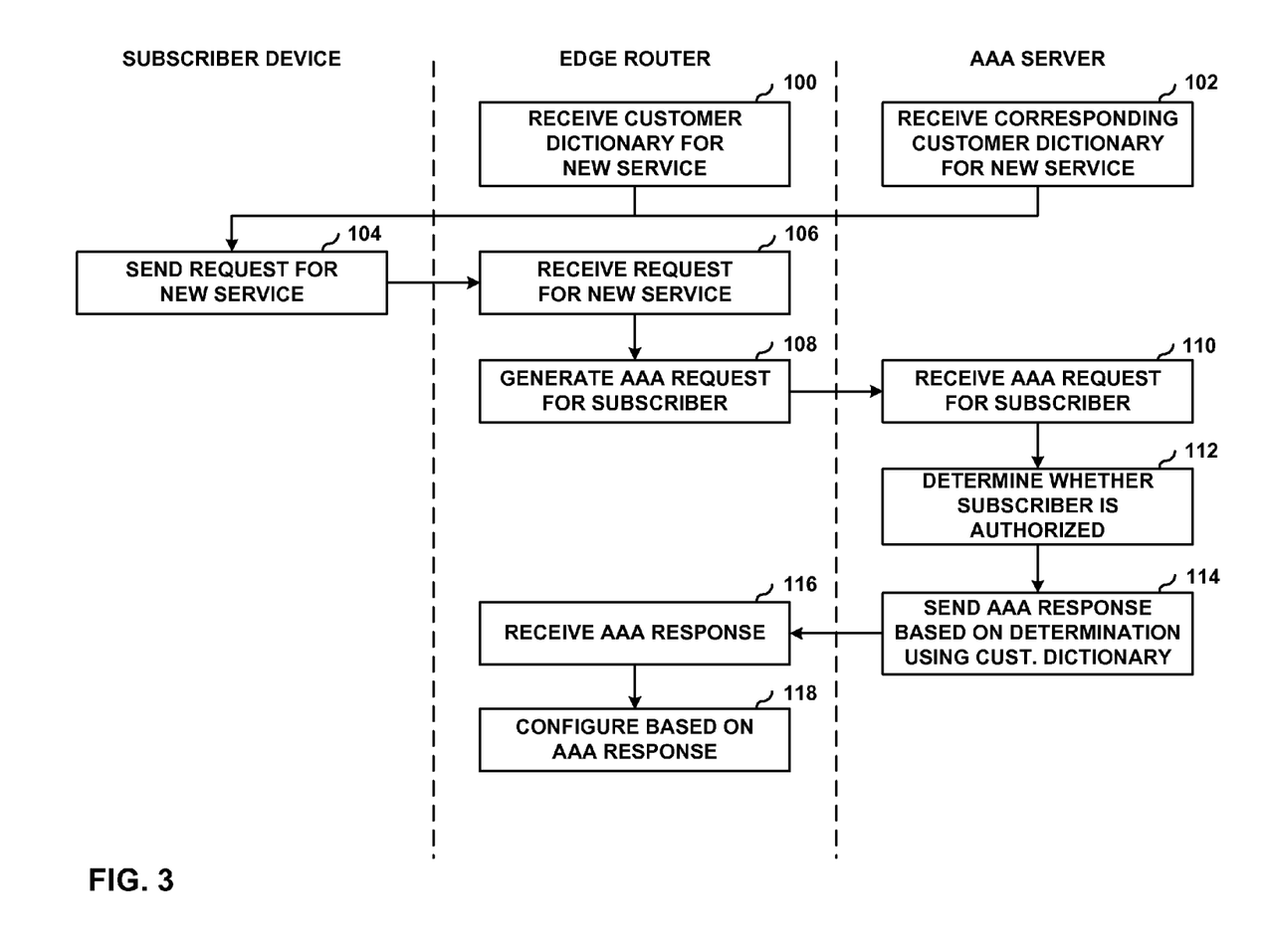
FIG. 3 is a flowchart illustrating an example method for configuring a network device to participate in a new service, other than one of a set of default services that are pre-configured by a vendor of the network device

FIG. 3 is a flowchart illustrating an example method for configuring a network device to participate in a new service, other than one of a set of default services that are pre-configured by a vendor of the network device. In this example, a subscriber device (e.g., subscriber device 30A of FIG. 1), an edge router (e.g., edge router 12 of FIG. 1), and a AAA server (e.g., AAA server 22 of FIG. 1) participate in the method. However, it should be understood that other devices may participate in this or a similar method.

In the example method of FIG. 3, edge router 12 receives a customer dictionary for a new service (100). Likewise, AAA server 22 receives a corresponding customer dictionary for the new service (102). As discussed above, e.g., with respect to FIGS. 1 and 2, edge router 12 is generally equipped with a default dictionary for pre-configured services by vendor 20 (FIG. 1). However, in accordance with the techniques of this disclosure, edge router 12 may also receive customer defined actions (e.g., opscripts, software developed using an SDK for edge router 12, or virtual services) that can be executed to configure edge router 12. Moreover, edge router 12 receives an attribute-value pair (e.g., a VSA and a corresponding value for the VSA) that a customer dictionary maps to a particular action for a new service. The new service is a service other than one of the pre-configured services from vendor 20. In other words, the new service represents an additional service beyond a set of default services configured by vendor 20.

Subscriber device 30A subsequently sends a request to access the new service (104). The new service may generally comprise any service that was not pre-configured by vendor 20. Such services may include, for example, security services such as intrusion detection and prevention, Internet access, bulk data delivery, voice over Internet protocol (VoIP), Internet Protocol television (IPTV), Short Messaging Service (SMS), Wireless Application Protocol (WAP) service, Telnet, or customer-specific application services, among other potential services. Accordingly, edge router 12 receives the request from subscriber device 30A (106) and generates a AAA request for subscriber device 30A (108), which edge router 12 sends to AAA server 22. For example, the AAA request may include a VSA, and a value for the VSA, that indicates to AAA server 22 that subscriber device 30A is requesting to access the new service.

AAA server 22, in turn receives the AAA request for subscriber device 30A (110). AAA server 22 then determines whether subscriber device 30A is authenticated and authorized to access the new service (112). AAA server 22 then sends a AAA response based on the determination using the customer dictionary (114). For example, if AAA server 22 determines that subscriber device 30A is authorized to access the new service, AAA server 22 uses the customer dictionary to determine a VSA, and value for the VSA, to cause edge router 12 to become configured to grant subscriber device 30A access to the service.

Edge router 12 receives the AAA response from AAA server 22 (116). In particular, AAA client 66 determines that the AAA response is to be sent to AAA framework 78 (FIG. 2). AVP processor 76 of AAA framework 78 analyzes the AAA response to determine values for one or more VSAs, and determines that customer dictionary 70 corresponds to one of the VSAs. Then, AVP processor 76 uses the value of the VSA to determine an appropriate one of applications 74 to execute, based on which of applications 74 is mapped to the value of the VSA by customer dictionary 70.

Edge router 12 then configures itself based on the AAA response (118). For example, edge router 12 executes the one of applications 74 to which the value of the VSA is mapped by, e.g., customer dictionary 70. Again, the one of applications 74 may comprise an opscript, software developed using an SDK for edge router 12, or a virtual service. Thus, edge router 12 may configure itself using an action (that is, an action defined by the one of applications 74) to direct traffic through service provider network 10 for subscriber device 30A based on data of the AAA response received from AAA server 22.

For example, as explained with respect to FIG. 2, edge router 12 may configure forwarding information of edge router 12 (e.g., FIB 84) to cause network traffic associated with subscriber device 30A to be forwarded to a service unit to perform the new service when AAA server 22 grants subscriber device 30A access to the new service. The service unit may comprise one of service cards 52 or a device of service provider network 10 beyond edge router 12. In this manner, the service unit may comprise a unit that is internal or external to edge router 12.

In this manner, the method of FIG. 3 represents an example of a method including receiving, by a network device comprising a default dictionary associated with one or more default services provided by the network device, configuration data defining a customer dictionary associated with one or more additional services beyond the one or more default services, receiving a request to access one of the additional services from a subscriber device, determining whether an authentication, authorization, and accounting (AAA) server grants access to the requested one of the additional services to the subscriber device as indicated by data of a AAA response message, and configuring, using an action determined using the customer dictionary, forwarding information of the network device to cause network traffic associated with the subscriber device to be forwarded to a service unit to perform the one of the additional services when the AAA server grants access to the subscriber device based on the data of the AAA response message and the determination.

Figure 4:
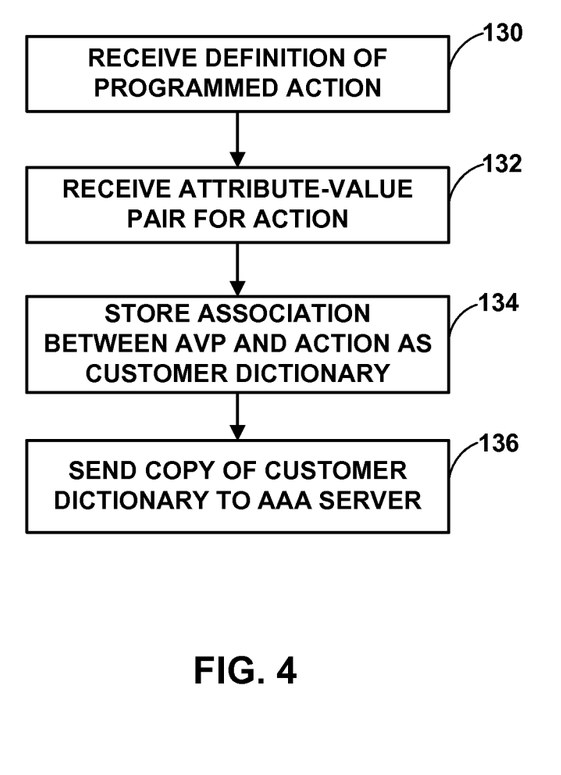
FIG. 4 is a flowchart illustrating an example method for obtaining a customer dictionary for a network device and a AAA server.

FIG. 4 is a flowchart illustrating an example method for obtaining a customer dictionary for a network device and a AAA server. The method of FIG. 4 may generally correspond to steps 100 and 102 of the method of FIG. 3, although other methods may be used to construct a customer dictionary as well. Moreover, the steps in the method of FIG. 4 may be performed in a different order than that shown in FIG. 3, or in parallel.

In this example, edge router 12 receives a definition of a programmed action (130). For example, edge router 12 may receive an opscript, software developed using an SDK for edge router 12 (or an operating system of edge router 12), or instructions for a virtual service. Edge router 12 also receives an attribute value pair for the action (132). For example, edge router 12 may receive a VSA and a value for the VSA, as well as an indication that the VSA-value pair is to be mapped to the programmed action. Thus, edge router 12 stores an association between the attribute-value pair and the action as a customer dictionary (134).

In this example, edge router 12 sends a copy of the customer dictionary to AAA server 22 (136). However, in other examples, an administrator, such as administrator 14, may perform steps similar to steps 130-134 on AAA server 22. In other examples, AAA server 22 obtains a copy of the customer dictionary in other ways, such as by querying edge router 12 for one or more customer dictionaries.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

The invention claimed is:

1. A method comprising:
receiving, by a network device comprising a default dictionary associated with one or more default services provided by the network device, configuration data defining a customer dictionary associated with one or more additional services beyond the one or more default services, wherein the default dictionary maps one or more values that can be received from an authentication, authorization, and accounting (AAA) server to one or more respective configuration actions to be performed on forwarding information of the network device in response to receiving the respective value from the AAA server, and wherein the customer dictionary maps one or more values that can be received from the AAA server to one or more respective configuration actions to be performed on the forwarding information of the network device in response to receiving the respective value from the AAA server;
receiving a request to access one of the one or more additional services from a subscriber device;
determining whether the AAA server grants access to the requested one of the one or more additional services to the subscriber device as indicated by data of a AAA response message; and
when the AAA server includes a value of the values of the customer dictionary in the AAA response message and grants the subscriber device access to the requested one of the one or more additional services, configuring, using a configuration action to which the customer dictionary maps the value of the AAA response message, the forwarding information of the network device to cause the network device to, in response to receiving network traffic, comprising a plurality of network packets, associated with the subscriber device, forward the network packets of the network traffic to a service unit to perform the one of the one or more additional services, wherein the network device is further configured to forward the network packets to a separate device external to the network device in accordance with the forwarding information.

2. The method of claim 1, further comprising, prior to receiving the request, receiving a definition of the action associated with the requested one of the one or more additional services, wherein configuring the forwarding information comprises executing the action.

3. The method of claim 2, wherein receiving the definition of the action comprises receiving an operation script.

4. The method of claim 2, wherein receiving the definition of the action comprises receiving a program developed using a software development kit (SDK) for the network device.

5. The method of claim 2, wherein receiving the definition of the action comprises receiving a definition of a virtual service.

6. The method of claim 2, further comprising:
prior to receiving the request, obtaining a vendor specific attribute (VSA) and a value for the VSA for the requested one of the one or more additional services; and
mapping the value for the VSA to the action in the customer dictionary.

7. The method of claim 6, wherein the data of the AAA response message comprises the value for the VSA.

8. A network device comprising:
one or more computer-readable storage media configured to store information defining a default dictionary associated with one or more default services provided by the network device, wherein the default dictionary maps one or more values that can be received from an authentication, authorization, and accounting (AAA) server to one or more respective configuration actions to be performed on forwarding information of the network device in response to receiving the respective value from the AAA server;
one or more interfaces configured to receive configuration data defining a customer dictionary associated with one or more additional services beyond the one or more default services, wherein the customer dictionary maps one or more values that can be received from the AAA server to one or more respective configuration actions to be performed on the forwarding information of the network device in response to receiving the respective value from the AAA server, and to receive a request to access one of the one or more additional services from a subscriber device; and
a control unit configured to determine whether a AAA server grants access to the requested one of the additional services to the subscriber device as indicated by data of a AAA response message, and when the AAA server includes a value of the values of the customer dictionary in the AAA response message and grants the subscriber device access to the requested one of the one or more additional services, to configure, using a configuration action to which the customer dictionary maps the value of the AAA response message, the forwarding information of the network device to cause network traffic, comprising a plurality of network packets, associated with the subscriber device, forward the network packets of the network traffic to a service unit to perform the one of the one or more additional services,
wherein the network device is further configured to forward the network packets to a separate device external to the network device in accordance with the forwarding information.

9. The network device of claim 8, wherein the one or more interfaces are configured to receive, prior to receiving the request, a definition of the action associated with the requested one of the one or more additional services, wherein configuring the forwarding information comprises executing the action.

10. The network device of claim 9, wherein the definition of the action comprises at least one of an operation script, a program developed using a software development kit (SDK) for the network device, and a definition of a virtual service.

11. The network device of claim 9, wherein the control unit is configured to obtain, prior to receiving the request, a vendor specific attribute (VSA) and a value for the VSA for the requested one of the one or more additional services, and map the value for the VSA to the action in the customer dictionary.

12. The network device of claim 11, wherein the data of the AAA response message comprises the value for the VSA.

13. The network device of claim 8, wherein the network device comprises a router.

14. The network device of claim 8, wherein the network device comprises an edge router.

15. A system comprising:
an authentication, authorization, and accounting (AAA) server; and
a network device configured to store information defining a default dictionary associated with one or more default services provided by the network device, wherein the default dictionary maps one or more values that can be received from the AAA server to one or more respective configuration actions to be performed on forwarding information of the network device in response to receiving the respective value from the AAA server, receive configuration data defining a customer dictionary associated with one or more additional services beyond the one or more default services, wherein the customer dictionary maps one or more values that can be received from the AAA server to one or more respective configuration actions to be performed on the forwarding information of the network device in response to receiving the respective value from the AAA server, to receive a request to access one of the one or more additional services from a subscriber device, determine whether the AAA server grants access to the requested one of the one or more additional services to the subscriber device as indicated by data of a AAA response message, and when the AAA server includes a value of the values of the customer dictionary in the AAA response message and grants the subscriber device access to the requested one of the one or more additional services, configure, using a configuration action to which the customer dictionary maps the value of the AAA response message, the forwarding information of the network device to cause the network device to, in response to receiving network traffic, comprising a plurality of network packets, associated with the subscriber device, forward the network packets of the network traffic to a service unit to perform the one of the one or more additional services, wherein the network device is further configured to forward the network packets to a separate device external to the network device in accordance with the forwarding information.

16. The system of claim 15, wherein the network device is configured to receive, prior to receiving the request, a definition of the action associated with the requested one of the one or more additional services, wherein configuring the forwarding information comprises executing the action.

17. The system of claim 16, wherein the definition of the action comprises at least one of an operation script, a program developed using a software development kit (SDK) for the network device, and a definition of a virtual service.

18. The system of claim 16, wherein the control unit is configured to obtain, prior to receiving the request, a vendor specific attribute (VSA) and a value for the VSA for the requested one of the one or more additional services, and map the value for the VSA to the action in the customer dictionary.

19. The system of claim 18, wherein the data of the AAA response message comprises the value for the VSA.

20. The system of claim 15, wherein the network device is configured to send a copy of the customer dictionary to the AAA server.

21. The system of claim 15, wherein the AAA server is configured to obtain a copy of the customer dictionary and to process AAA requests from the network device using the customer dictionary.

22. A non-transitory computer-readable storage medium comprising instructions that, when executed, cause a processor to:
receive, by a network device comprising the processor and a default dictionary associated with one or more default services provided by the network device, configuration data defining a customer dictionary associated with one or more additional services beyond the one or more default services, wherein the default dictionary maps one or more values that can be received from an authentication, authorization, and accounting (AAA) server to one or more respective configuration actions to be performed on forwarding information of the network device in response to receiving the respective value from the AAA server, and wherein the customer dictionary maps one or more values that can be received from the AAA server to one or more respective configuration actions to be performed on the forwarding information of the network device in response to receiving the respective value from the AAA server;
receive a request to access one of the one or more additional services from a subscriber device;
determine whether the AAA server grants access to the requested one of the one or more additional services to the subscriber device as indicated by data of a AAA response message; and
when the AAA server includes a value of the values of the customer dictionary in the AAA response message and grants the subscriber device access to the requested one of the one or more additional services, configure, using a configuration action to which the customer dictionary maps the value of the AAA response message, the forwarding information of the network device to cause the network device to, in response to receiving network traffic, comprising a plurality of network packets, associated with the subscriber device forward the network packets of the network traffic to a service unit to perform the one of the one or more additional services, wherein the network device is further configured to forward the network packets to a separate device external to the network device in accordance with the forwarding information.

23. The non-transitory computer-readable storage medium of claim 22, further comprising instructions that cause the processor to receive, prior to receiving the request, a definition of the action associated with the requested one of the one or more additional services, wherein configuring the forwarding information comprises executing the action.

24. The non-transitory computer-readable storage medium of claim 23, wherein the instructions that cause the processor to receive the definition of the action comprise instructions that cause the processor to receive at least one of an operation script, a program developed using a software development kit (SDK) for the network device, and a definition of a virtual service.

25. The non-transitory computer-readable storage medium of claim 23, further comprising instructions that cause the processor to:
prior to receiving the request, obtain a vendor specific attribute (VSA) and a value for the VSA for the requested one of the one or more additional services; and
map the value for the VSA to the action in the customer dictionary.

26. The non-transitory computer-readable storage medium of claim 25, wherein the data of the AAA response message comprises the value for the VSA.

* * * * *